United States Patent Office 2,852,402
Patented Sept. 16, 1958

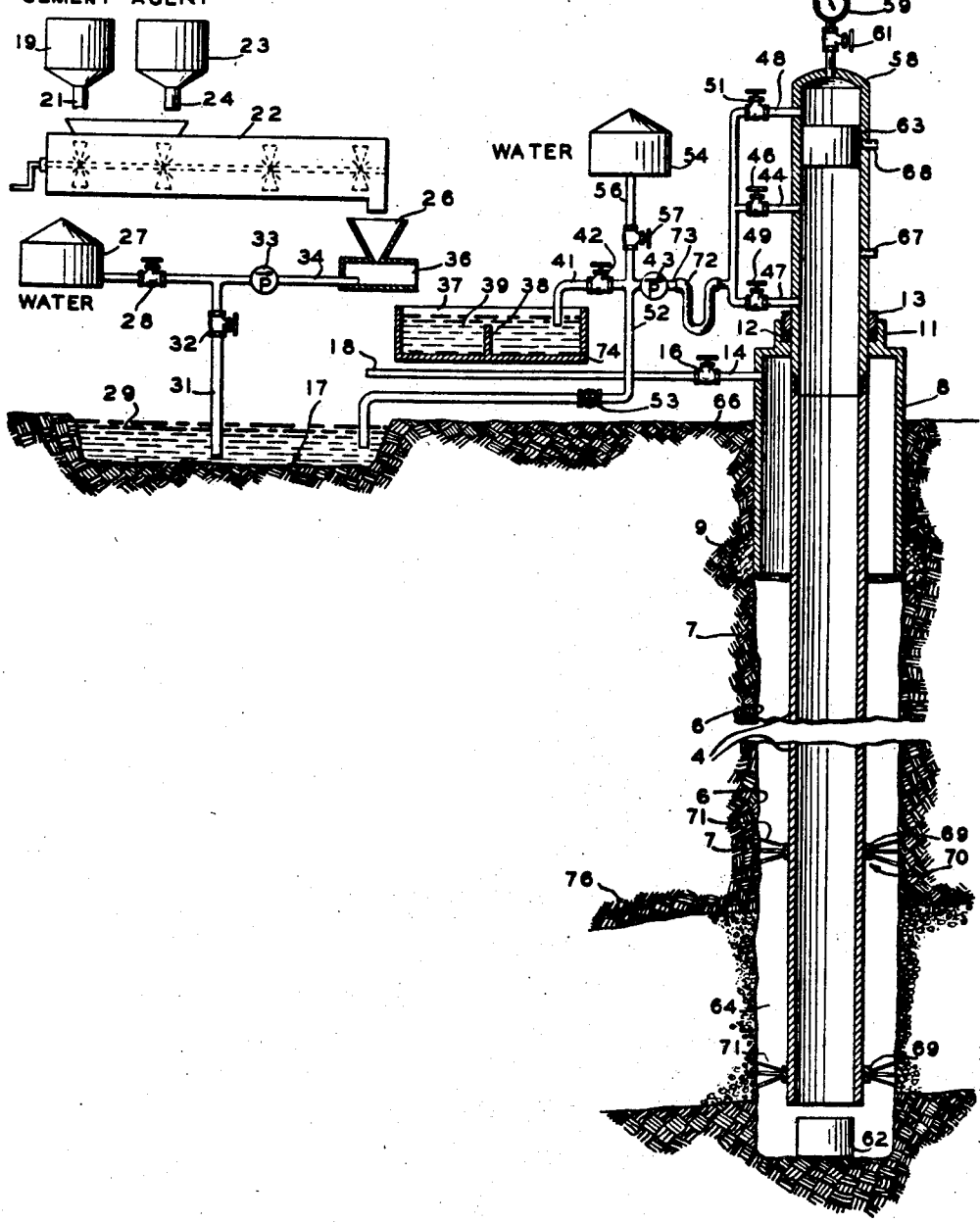

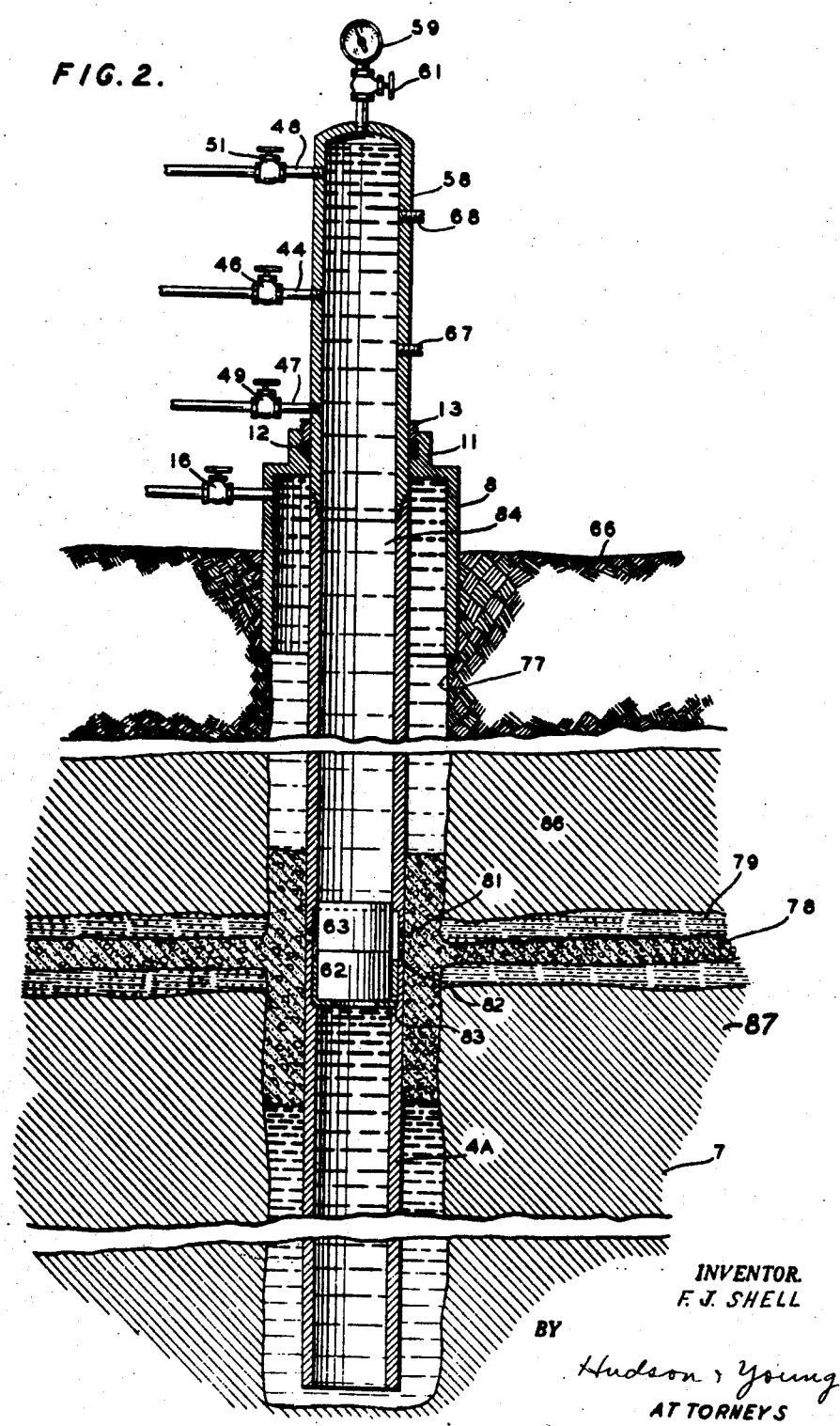

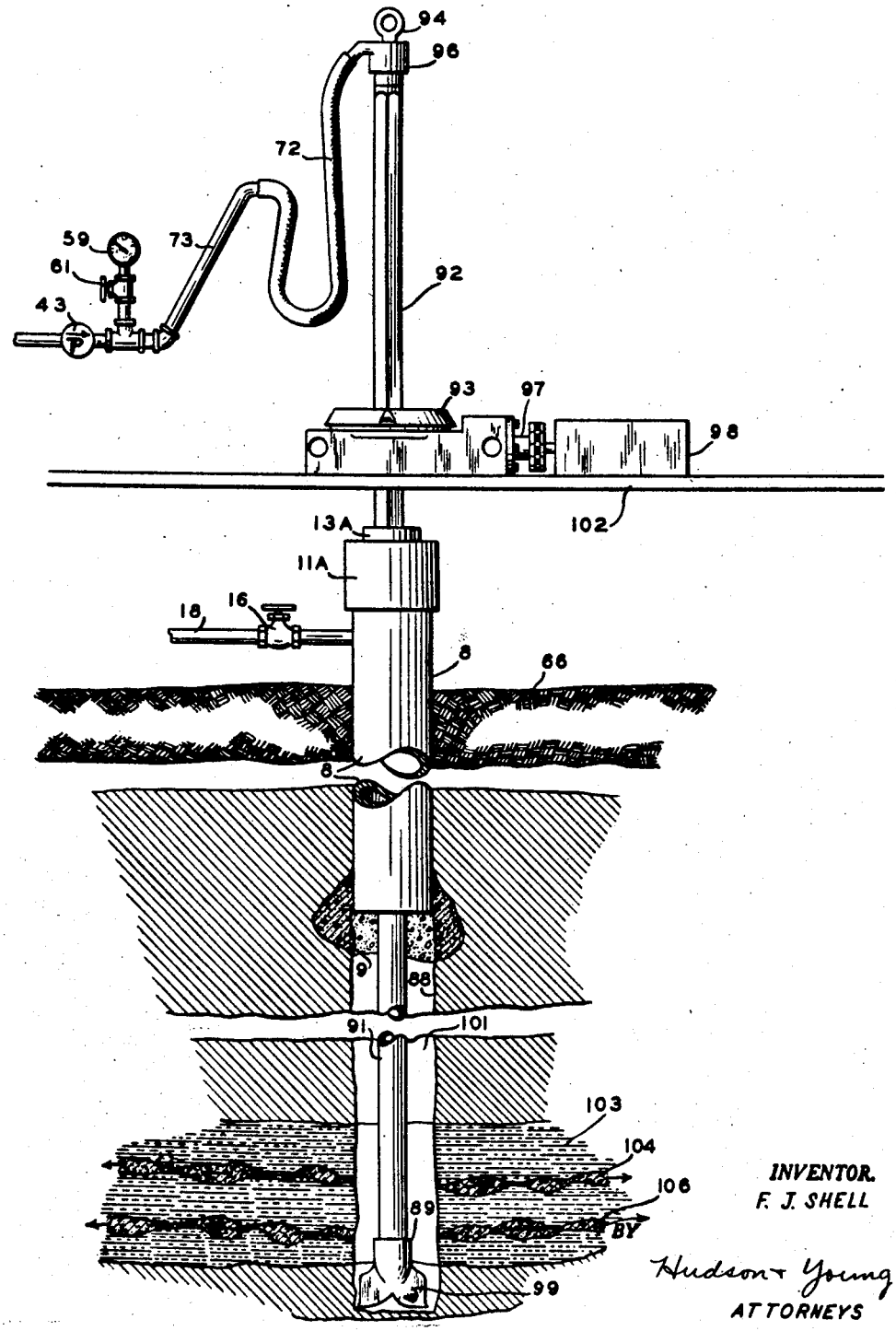

2,852,402

CEMENT COMPOSITION

Francis J. Shell, Bartlesville, Okla., assignor to Phillips Petroleum Company, a corporation of Delaware Application January 3, 1955, Serial No. 479,360

13 Claims. (Cl. 106—93)

This invention relates to cement compositions. In one aspect it relates to such compositions and processes in which a first agent is employed to increase the cement thickening time of a hydraulic cement and reduce the water loss, and a second agent is employed to further reduce the water loss.

It has been found that the addition of said first agent, sodium carboxymethyl hydroxyethyl mixed ether for example, to cement composition aqueous slurries containing hydraulic cement, such as Portland cement, has two valuable effects, namely, reducing the water loss from such slurries to adjacent and contacting porous pervious earth formations by filtration, known to the art as water loss reduction, and increasing the thickening time of the cement, known to the art as the time until the viscosity of the slurry reaches 100 poises. At the same time the time of initial set and final set are also somewhat retarded, but it is preferred to refer to thickening time as this has a closer relation to the ability of pumps to pump the cement down the well, which ability is obviously gone somewhat before initial set is reached. Thickening time is tested under API code RP 10B. Water loss is tested under API code 29, which was drafted for drilling muds, but similar tests probably will be in code 10B when revised.

However, I have found that the effectiveness of said first agent in reducing the water loss can be increased by the addition of critical amounts of a second agent, sodium chloride for example. It is important to have a low water loss, as otherwise the cement slurry will dehydrate and set prematurely when it contacts a porous and pervious formation, especially when the drilling mud cake has been removed by scrapers preparatory to cementing the well, resulting in pump failure under increasing pressure to place the cement slurry properly throughout the entire extent of the well that should be cemented in order to do a successful well cementing job. The present invention is an improvement on my copending application Serial No. 472,954, filed December 3, 1954.

One object of the present invention is to provide a suitable hydraulic cement aqueous slurry, and suitable processes employing the same, for cementing casing in wells, for squeeze cementing in wells, and for grouting cracks, fractures or voids, in natural formations, such as in wells, or in man-made formations such as dams, breakwaters, walls and massive foundations and structures of all types.

Another object of this invention is to provide a dry hydraulic cement powder which is a novel composition of matter, and which may be mixed with water to form an aqueous cement slurry which is a novel composition of matter and which has a low water loss.

Further objects of the invention reside in the provision of a slurry of the above cement.

These and further objects of the invention will be more readily apparent in the following description.

In the cementing of oil wells it is customary to mix a hydraulic cement, for example a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, using a substantially heavier cement slurry than the drilling mud it replaces may result in forcing the cement out into the formation due to collapse of a friable formation, or displacement of the fluid in said formation by the heavier cement slurry, with the result that much cement is lost out into the formation instead of cementing much higher in the well in the annulus between the casing and the wall of the well.

Everything which is said applying to natural formations in wells applies also in some degree to man-made formations being grouted, and the word "formation" as used herein is regarded as generic to natural earth formations, geological formations, and man-made formations such as structures.

In the drawings:

Figure 1 is an elevational view with parts in section of apparatus suitable to carry out the processes of the present invention in compounding the hydraulic cement slurry and cementing a casing in a well, or grouting a formation.

Figure 2 is a cross-sectional view of a portion of a well in which squeeze cementing is being employed to place a cementitious horizontal dam out into the surrounding formation.

Figure 3 is a cross-sectional view of a portion of a well in which a porous formation is plugged to prevent loss of circulation while drilling.

Figure 1 illustrates some of the processes devised by the present invention for cementing a casing 4 in a well 6 drilled in formation 7, or for grouting cracks or crevices in formation 7, it being understood that formation 7, instead of being a natural geological formation, may be a man-made formation such as a foundation, dam, breakwater, or other concrete or masonry structure. While casing 4 could be placed in the open bore 6 of the well, and the circulated drilling mud, hydraulic cement aqueous slurry, or other fluids in the bore 6 could be allowed to emerge around pipe 4 onto the surface of the formation 7 from the uncased bore 6, it is preferred to have at least one casing, soil pipe, or other pipe 8 secured in sealing contact with formation 7, either by close fit or by previous cementing 9. The pipe 8 is provided with a casing head 11 having a stuffing box or packing 12 forced into sealing contact with casing 4 by some sort of follower 13. Casing head 11 also is provided with an outlet pipe 14 which is preferably controlled by a valve 16 and which may discharge into a mud pit generally designated as 17 through pipe 18.

A suitable amount of a suitable grade of hydraulic cement, such as Portland cement, is fed from bin 19 through valve 21 into mixer 22 and a minor but effective amount of agent by weight of the dry hydraulic cement, is also fed into mixer 22 from the bin 23 controlled by valve 24. Of course this mixing in mixer 22 need not occur anywhere near the well, but could have taken place any number of miles away and several months before, and then the ready-mixed cement composition brought to the well in sacks (not shown) or in a bulk cement truck (not shown). In an event the dry cement composition from mixer 22, or from cement sacks (not shown) is dumped into hopper 26 where it is picked up and mixed with a jet of water from tank 27 controlled by valve 28, the water being forced by pump 33 through jet pipe 34. This water forms the cement into a pumpable slurry. The jet of liquid from 34 picks up and mixes with the dry cement from hopper 26 and discharges the same out opening 36, which could connect directly to casing 4. To insure thorough mixing, allow for inspection, and act as a surge reservoir, a suitable reservoir 37 is generally provided and I have found it useful to have a baffle in the same, over which the hydraulic cement slurry flows, and is then picked up by pipe 41 controlled by valve 42 from which it may be pumped by pump 43 into casing 4 through pipe 44 controlled by valve 46. Pipes 47 and 48 controlled by valves 49 and 51 respectively, are both reserved for drilling mud 29 from mud pit 17, drawn through pipe 52 controlled by valve 53 when desired, or water from tank 54 drawn through pipe 56 controlled by valve 57 when desired. Pipe 31 controlled by valve 32 allows the cement slurry in reservoir 37 to be replaced by drilling mud 29 to clean it and pipes 41 and 42 free of cement slurry before the slurry sets in place and is hard to remove.

Casing 4 obviously generally consists of a number of pipes screwed together to form a single pipe and at its upper end it is provided with some type of casing head 58. While not essential, it is useful to have a pressure gauge 59 connected at some point in the system. The pressure gauge can be cut off by valve 61.

While casing 4 could be cemented without the use of plugs 62 and 63 simply by opening valves 16, 42 and 49, and pumping hydraulic cement slurry with pump 43 down inside of casing 4, out the end thereof and up around the annular space 64 between bore 6 and casing 4 on to the ground surface 66 around casing 4 (if no soil pipe 8 is employed) this would not produce the best type of cementing available as the interior of the casing 4 would be full of cement which would have to be drilled out, and no pump pressure could be placed on the slurry. It is also possible to cement by reverse circulation by connecting pipe 73 to pipe 14 instead of pipe 72 and connecting pipe 18 to pipe 72 instead of pipe 14. The cement goes directly into annulus 64 through pipe 14 displacing the mud up casing 4 and out of the well. Whether soil pipe 8 is present for pressure control or not, it is possible, when desired in the process, to close valve 42 and open either valve 53 or 57 and follow the cement with water 54 or drilling mud 29, and by counting the strokes of the pump and stopping the same and closing valve 49 at the proper time to stop the cement water interface before the drilling mud or water comes out the bottom of casing 4, and thus cement without plugs 62 and 63 and still have casing 4 almost free of cement. By providing soil pipe 8, casing head 11, flow line 18, valve 16 and casing head 58, it is easy to place pressure on the slurry by throttling or closing valve 16 when desired.

The two plug method illustrated, however, is preferred. Starting with plug 62 secured in casing head 58 between pipes 44 and 47 by set screws 67 and plug 63 held as shown with set screws 68 and all of valves 42, 53, 57, 51, 46, 49 and 16 closed, it is usual to first wash the annular space 64 of well bore 6 with either drilling mud 29 or water 54, in most cases drilling mud 29 being preferred, and to do so valves 53 or 57 is opened, depending on whether drilling mud 29 or water is used, valve 16 is opened and valve 49 is opened and pump 43 is started, pumping drilling mud (or water) through casing 4 up through annular space 64 and out through pipe 18. At the same time casing 4 may be moved up and down through stuffing box 11, packing 12 being loosened by loosening follower 13, and casing 4 may, if desired, have secured thereto wall scraper elements generally designated as 70 which may comprise annular rings 69 secured to casing 4, mounting more or less radial wire bristles, rods or strips 71 which scrape the drilling mud cake off the walls of well bore 6 in order to provide a good bond between the formation 7, the well, and casing 4. Any number of scrapers 69 may be provided and the movement of casing 4 may be great enough so that the scraping of the one set of scrapers 69 will overlap the scraping of the next adjacent set, and to allow this movement a flexible section of pipe 72 may be provided in the line 73 from pump 43.

When the washing of the well and cleaning of the walls is sufficiently accomplished, pump 43 is stopped, and whichever of valves 53 and 57 was opened is closed. The casing 4 at that time is spaced from the bottom of the hole 6 a distance less than the length of plug 62 plus a portion of the length of plug 63 but greater than the length of plug 62. Follower 13 of stuffing box 11 is adjusted to seal at 12 around casing 4. Valves 16, 42 and 46 are open and set screw 67 is screwed away, releasing plug 62, and pump 43 is started, pumping hydraulic cement slurry from sump 74 of reservoir 37 into the space between plugs 62 and 63, forcing plug 62 down casing 4 and out the end thereof into the position shown. The cement forces the plug out the end of casing 4 and proceeds up the annulus 64 forcing the mud or water ahead of it up annulus 64 and in doing so it may have to traverse an especially porous formation 76 which will tend to take the water away from the slurry, especially if the drilling mud has been scraped from the surface of formation 76 by the scrapers 71. When the hydraulic cement slurry commences emerging from pipe 18, or when it is believed that it would emerge from pipe 18 or would reach the desired elevation in annulus 64 as soon as casing 4 were cleared of cement, depending on the type of cementing job desired, then valve 51 and one of valves 53 or 57 are opened, set screw 63 is loosened, and valves 42 and 46 are closed, whereupon the water (or drilling mud) passes through pipe 48 into casing head 58, moving plug 63 down the casing 4 until plug 63 rests on top of plug 62 but is unable to come out of the bottom of the casing and therefore plugs the end of casing 4, whereupon the pressure (as indicated by gauge 59) goes up as an indication of what has happened, valve 51 is closed and pump 43 is shut down, leaving the annular space 64 full of cement and the inside of casing 4 full of water or drilling mud.

Any time during the entire pumping process from the time the cement reaches 76 until plug 63 seats on plug 62 that it is desired to drive the hydraulic cement slurry into the more porous portions of the formation, such as formation 76, it is only necessary to throttle pipe 18 by partially closing valve 16, or if desired, to close valve 16 completely for the desired time, which action will send up the pressure in the system to the desired degree and force cement slurry into formation 76 if it will take the same at that pressure.

The U. S. patents now in Class 166, Wells, Subclass 22, Cementing or Plugging, disclose a number of other suitable cementing processes which may be employed in my invention.

Figure 2 is illustrative of a well 77 similar to well 6 and equipped with similar equipment in which a squeeze cementing job is employed to place a cementitious horizontal dam 78 out into the surrounding formation 79. As will be noted by the use of similar numbers, the equipment at the top of the well is all the same as in Figure 1 and is operated in the same manner. Casing 4A differs from casing 4 somewhat, in that the intermediate portion of casing 4A is provided with a number of radial holes 81 which holes are at first covered by sleeve 83 held in place by frangible pin 82. When plug 62 comes down the casing 4A ahead of the cement it catches in sleeve 83, breaks frangible pin 82 and opens openings 81 to cement. This causes a jump of the indicator needle of gauge 59 and at the same time valve 16 can be closed for as long a period of time as desired so that cement 78 can be forced away out into formation 79. When plug 63, which is followed by liquid 84 which may be water 54 or drilling mud 29, reaches the top of plug 62 it plugs the interior of casing 4A, closing the holes 81. Incidentally, in both Figures 1 and 2, plugs 62 and 63 are made of wood, or some easily drillable plastic composition, and preferably sleeve 83 is made of some drillable material, such as aluminum or magnesium, so that after cement dike 78 has set, the casing 4A can be drilled out to its original diameter and drilling or other desired operations carried out through the same.

In Figure 2 the formation 86 and 87 may be more impervious than formation 79, and the crack into which cement 78 is forced may have originally been formed by the pressure on the slurry of pump 43 with valve 16 closed, in which case formation 86 and all overlying formations are raised or compressed enough to make room for cement 78. These formations 86, 87 and 79 may all be man-made, such as layers of earth, concrete or masonry, as in a big dam or other foundation.

In Figure 3 are illustrated rotary drilling operations in which a well 88 is being drilled with a fishtail bit 89 rotated at the end of a drill string 91. Drill string 91 has a square section 92 known as a kelly which is slidably and rotatably engaged with a square hole or bushing in rotary table 93, the drill bit being supported from eye 94 of rotary swivel 96 by means of a hoisting tackle (not shown) and rotary table 93 is rotated through gear 97 driven by motor 98. At the same time pump 43 is pumping drilling mud 29 (see Figure 1) through pipe 73, flexible section 72 and rotary swivel 96 down the inside of kelly 92 and drill string 91 and out of the jet hole of bit 89, returning through annular space 101 through soil pipe 8, valve 16 and pipe 18 into mud pit 17. Soil pipe 8 is provided with a stuffing box 11A, which because the kelly is square has to have a rotatable portion 13A slidably packing against the square sides of kelly 92. Such equipment is well known in the art of drilling wells, as shown by U. S. patents in Class 166, Wells, Subclass 15, Controllers; and Class 255, Earth Boring, Subclass 19A, Rotary, Blowout Preventers.

Motor 98 and rotary table 93 are supported by floor 102 of the usual rotary well drilling rig, the remainder of which drilling rig is not shown but is well known to those skilled in the art.

When rotary drilling, sometimes a cavernous formation 103 is encountered, containing passages 104 and 106, which may have an apparently unlimited capacity for taking up drilling mud in the direction shown by the arrows. When such a formation is encountered, instead of directing ordinary drilling mud 29 in through pipe 52 and pumping the same down drill string 91 with pump 43, valve 53 is closed (see Figure 1) and valves 28 and 35 are opened, pump 33 is started, valve 32 being closed, and water is jetted through 34 and mixed with hydraulic cement, which is discharged as an hydraulic cement slurry into 39 from which it is picked up by pipe 41, valve 42 being open, and valves 53 and 57 closed, by pump 43 and pumped down drill string 91. At this time valve 16 may be closed to increase the pressure forcing the slurry back into caverns 104 and 106, but closing valve 16 may be unnecessary if caverns 104 and 106 are already taking the drilling mud completely. Whenever the operator, because of rising pressure or the returning of slurries through pipe 18, decides that caverns 104 and 106 are shut off and circulation has been restored valve 42 is closed and valve 53 is opened, valve 16 now being opened, and the rotary drilling continues in the usual manner with drilling mud 29 from mud pit 17 washing the remains of the cement slurry out of bore 101 and pipe 18. Obviously the pump 33 is shut down as soon as slurry 29 is no longer needed, and pipe 18 can be deflected to another mud pit or dumping place (not shown) to avoid the cement slurry returning to mud pit 17, until cement-free mud returns, and then it can be deflected back to mud pit 17. These formations being drilled may be man-made as in a dam, or may be natural formations encountered as in oil well drilling.

By hydraulic cement 19 this invention intends to include all mixtures of lime, silica, and alumina, or of lime and magnesia, silica and alumina and iron oxide (magnesia for example may replace part of the lime, and iron oxide a part of the alumina), as are commonly known as hydraulic cements. Hydraulic cements include hydraulic limes, grappier cements, puzzolan cements, natural cements and Portland cements. Puzzolan cements include slag cements made from slaked lime and granulated blast furnace slag. Because of its superior strength Portland cement is preferred among the hydraulic cements, but as the art of cements recognizes hydraulic cements as a definite class, and as results of value may be obtained with any member of that class, it is desired to claim all hydraulic cements. In addition to the ordinary construction grades of Portland cement or other hydraulic cements, modified hydraulic cements and Portland cements designated as high-early-strength cement, heat resistant cement, and slow-setting cement may be used in the present invention.

The agent 23 is a mixture of the following two ingredients, which have been found operable and useful in practicing the invention in the percentages given in the column "Operable amounts," and to give best results in the percentages given in the column headed "Preferred amounts" of the following Table I. The percentages are all weight percentages of the weight of the dry hydraulic cement 19 employed in the cement composition, but the sodium chloride is also given in parts per million by weight of the water employed, because when the salt is supplied dry in the cement it is preferred to measure it in weight percent of the dry cement, but when it is supplied in the mixing water it is preferred to measure it in parts per million of the water.

TABLE I

| Materials | | Operable Amounts | Preferred Amounts |
| --- | --- | --- | --- |
| Bentonite | percent | 0 to 5 | 1 to 4 |
| Aggregate | do | 0 to 70 | [1] 15 to 50 |
| CMHEC [2] | do | 0.1 to 10 | 0.3 to 3 |
| AM silicate [3] | do | 0.1 to 15 | [4] 0.3 to 7 |
| Sodium Chloride | do | 0.02 to 8 | 0.04 to 4 |
| Sodium Chloride | p. p. m. | 500 to 20,000 | 1,000 to 10,000 |

[1] 20% for 12 to 13.5 lbs. per gallon, 40% for 10.5 to 12 lbs. per gallon cement slurry densities, other slurry densities in proportion.
[2] CMHEC is used as an abbreviation for a cement thickening time extending and water loss reducing agent selected from the group consisting of acid carboxyalkyl hydroxyethyl cellulose mixed ethers in which the alkyl group contains one to two carbon atoms, preferably sodium carboxymethyl hydroxyethyl cellulose mixed ether, in which the total substitution per anhydroglucose unit of the cellulose of both carboxyalkyl and hydroxyethyl groups is from 0.5 to 1.75, the hydroxyethyl substitution is from 0.35 to 1.35, and the carboxyalkyl substitution is from 0.15 to 1.2, and all metal, ammonium, amide, and other salts of said mixed ethers, but preferably the alkali metal salts thereof. The amount of CMHEC varies with the amount of aggregate used and ranges from about 0.3 with no aggregate to 3% with 60% aggregate, and other amounts in proportion. However, 0.1 to 10% gives results of some value in the practice of the invention over the same range of aggregate.
[3] AM silicate is used as an abbreviation for an alkali metal silicate, preferably sodium silicate, having a silicon dioxide to alkali metal oxide ratio of from 0.1 to 10.
[4] Depending on the thickening time desired. For example, 2.6% with 1.5% CMHEC and 40% aggregate (diatomaceous earth for example) in a well 6000 feet deep.

The amount of water used to make the slurry may vary widely as long as sufficient water is added to make the slurry fluid and pumpable. For example, the invention is operable with about 40 to 400% water by weight of the dry Portland cement, it is preferred to use 54% when no diatomaceous earth aggregate is used and 220% is preferred when used with 40% diatomaceous earth aggregate, and other mixtures in proportion. Simple tests can be used to determine if there is enough water present to make a pumpable slurry without substantially increasing the water loss. River water can usually be employed, as the invention is not sensitive to the amount of salts, silt, or clay, in river water which has stood in a tank long enough to drop excess mud, and is not hurt much by that much mud even if not removed, except that the sodium chloride in said water obviously is taken into account in making the water have the desired content in parts per million by weight.

The bentonite employed may be either hydrated or unhydrated bentonite as weighed in the unhydrated normal state in which bentonite is generally sold and shipped. While it is preferred to use the best commercial grade of unhydrated Wyoming bentonite, any bentonite such as El Paso surface clay, Wilmington slough clay, and all bentonitic clay containing a high percentage of montmorillonites, particularly the sodium salt of montmorillonite are suitable, and the calcium or other salts of montmorillonites give valuable results in the practice of the invention of the same nature as the sodium salt in somewhat less degree.

The aggregate in Table I is preferably diatomaceous earth, any fairly good grade of the same being suitable. The "Celite" brand of diatomaceous earth is preferred but any technical grade of diatomaceous or infusorial earth such as kieselguhr, guhr, diatomite, tripolite, tellurine, terra silicea, ceyssatite, or fossil flour may be employed. In addition somewhat inferior but nevertheless valuable results may be obtained by the practice of this invention by employing other porous aggregates such as pumice, vermiculite, exfoliated vermiculite, popped pumice, and other lightweight aggregates known to the prior art in amounts similar to those given in Table I for diatomaceous earth (Celite).

Acid carboxymethyl hydroxyethyl cellulose mixed ether may be made from cellulose by reacting to form the carboxymethyl portion first and then the hydroxyethyl portion, or vice versa, or both at once. Reacting ethylene oxide with alkali cellulose is the commercial way to make hydroxyethylcellulose, see page 422 of the book "Cellulose Chemistry" by Heuser (1946) (John Wiley & Sons Inc., New York). The reaction is that of addition and is formulated as:

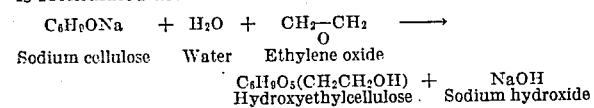

$$C_6H_9O_5Na + H_2O + CH_2\!-\!CH_2 \longrightarrow$$
Sodium cellulose    Water    Ethylene oxide
$$C_6H_9O_5(CH_2CH_2OH) + NaOH$$
Hydroxyethylcellulose    Sodium hydroxide Other methods are mentioned on page 423 of said book. $C_6H_{10}O_5$ is one anhydroglucose unit of which there are many in each cellulose molecule.

On pages 421 and 422 of said book the preparation of carboxymethylcellulose (also known as glycolic acid ether of cellulose) is disclosed. It is formulated as:

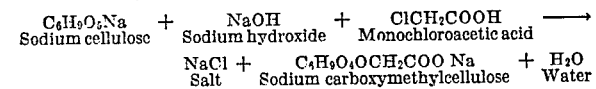

$$C_6H_9O_5Na + NaOH + ClCH_2COOH \longrightarrow$$
Sodium cellulose    Sodium hydroxide    Monochloroacetic acid
$$NaCl + C_6H_9O_4OCH_2COONa + H_2O$$
Salt    Sodium carboxymethylcellulose    Water By reacting some of the cellulose hydroxyl groups in a sodium cellulose molecule with ethylene oxide and some with sodium hydroxide and monochloroacetic acid, sodium carboxymethyl hydroxyethyl cellulose mixed ether is formed. This may be converted to acid carboxymethyl hydroxyethyl cellulose mixed ether by reaction with an acid such as nitric acid and removal of the resulting sodium nitrate or other salt by purification, if purification is desired. When used in cement in the present invention, such purification is not always necessary. The substitution of both types of radicals need not be on the same anhydroglucose unit of the molecule; sometimes it is, and sometimes not. Nor is it necessary that all anhydroglucose units be reacted with either, as those units in the molecule that are so reacted will make the molecule active as a cement additive. It is preferred to have a combined substitution of carboxymethyl and hydroxyethyl radicals per anhydroglucose unit averaging from 0.5 to 1.75 in which the carboxymethyl radicals average from 0.5 to 1.2 and the hydroxyethyl radicals average from 0.35 to 1.35 but valuable results are still obtained outside of this range, especially if the mixed ether is water-soluble, or will hydrolyze to give water-soluble salts.

The sodium chloride of Table I may be ordinary rock salt and can be added to the cement, the water, or be already present in the water employed, or any combination of these.

EXAMPLE A

The following tests in Table II show that Portland cement of the "Lone Star" (trademark) brand to which 0.5% by weight of the dry Portland cement of sodium carboxymethyl hydroxyethyl cellulose mixed ether and 54% water has been added to form an aqueous pumpable slurry, had a water loss of 20 ml. in 12 minutes at 100 pounds per square inch pressure in the standard drilling mud filtration tests, and this water loss was substantially reduced by the addition of 3000 p. p. m. sodium chloride in said water in run No. 5 whereas the other amounts of sodium chloride had the noted effect.

TABLE II
*Water loss tests*

| Run | NaCl, p. p. m. | ml./min. Water Loss |
|---|---|---|
| 1 | 0.0 | 20/12 |
| 2 | 500 | 12/30 |
| 3 | 1,000 | 12/30 |
| 4 | 2,000 | 8/30 |
| 5 | 3,000 | 7.5/30 |
| 6 | 4,000 | 9/30 |
| 7 | 10,000 | 17/10 |

The tests in Table III were made with Portland cement of the "Dewey" (trademark) brand Class A cement, to which the noted percent by weight of the dry Portland cement of sodium carboxymethyl hydroxyethyl cellulose mixed ether (CMHEC) was added. The percent of water and diatomaceous earth ("Celite" trademark brand) by weight of the dry Portland cement, and the weight per pound of the resulting slurries is noted. It will be noted that the greatest reduction of water loss in the water loss test is milliliters in thirty minutes occurred when the sodium chloride content of the mixing water was roughly in the neighborhood of 5000 p. p. m.

TABLE III

| Run | CMHEC, percent | Celite, percent | Water, percent | Weight, lbs./gal. | NaCl, p. p. m. | Water-loss, ml. in 30 min. |
|---|---|---|---|---|---|---|
| 8  | 0.25 | 0  | 54  | 15 | 0      | 167 |
| 9  | 0.25 | 0  | 54  | 15 | 2,500  | 79  |
| 10 | 0.25 | 0  | 54  | 15 | 5,000  | 54  |
| 11 | 0.25 | 0  | 54  | 15 | 7,500  | 66  |
| 12 | 0.25 | 0  | 54  | 15 | 10,000 | 88  |
| 13 | 0.3  | 0  | 54  | 15 | 0      | 18  |
| 14 | 0.3  | 0  | 54  | 15 | 2,500  | 14  |
| 15 | 0.3  | 0  | 54  | 15 | 5,000  | 8   |
| 16 | 0.3  | 0  | 54  | 15 | 7,500  | 16  |
| 17 | 0.3  | 0  | 54  | 15 | 10,000 | 16  |
| 18 | 0.5  | 0  | 54  | 15 | 0      | 18  |
| 19 | 0.5  | 0  | 54  | 15 | 2,500  | 11  |
| 20 | 0.5  | 0  | 54  | 15 | 5,000  | 8   |
| 21 | 0.5  | 0  | 54  | 15 | 7,500  | 8.5 |
| 22 | 0.5  | 0  | 54  | 15 | 10,000 | 9   |
| 23 | 0.5  | 0  | 54  | 15 | 15,000 | 9   |
| 24 | 0.5  | 0  | 54  | 15 | 20,000 | 10  |
| 25 | 0.5  | 0  | 54  | 15 | 50,000 | 13  |
| 26 | 1.0  | 40 | 220 | 11 | 0      | 37  |
| 27 | 1.0  | 40 | 220 | 11 | 2,500  | 26  |
| 28 | 1.0  | 40 | 220 | 11 | 5,000  | 28  |
| 29 | 1.0  | 40 | 220 | 11 | 7,500  | 28  |
| 30 | 1.0  | 40 | 220 | 11 | 10,000 | 29  |
| 31 | 1.0  | 40 | 220 | 11 | 15,000 | 31  |

While the water loss reduction in runs 26 to 31 was less pronounced with 40% diatomaceous earth present, it still was about 10 times greater than the estimated experimental error, and therefore was a definite improvement.

In preferred runs 10 and 20 5,000 p. p. m. salt is 0.27% salt by weight of the dry cement and in preferred run 28 it is 1.1% by weight of the dry cement.

While several illustrative examples have been given above, the invention is not limited thereto.

Having described my invention, I claim:

1. A cement composition aqueous slurry comprising a major portion of a dry hydraulic cement mixed with minor weight percentages of the weight of said dry hydraulic cement of 0.1 to 10% of a water loss reducing agent consisting of acid carboxyalkyl hydroxyethyl cellulose mixed ethers in which the alkyl group contains 1 to 2 carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, sufficient water to make said slurry fluid, and from 500 to 20,000 parts per million by weight sodium chloride in said water as a second water loss reducing agent.

2. A cement composition aqueous slurry comprising a major portion of Portland cement mixed with minor weight percentages of the weight of said dry Portland cement of 0.3 to 3% of a water loss reducing agent consisting of an alkali metal carboxymethyl hydroxyethyl cellulose mixed ether, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, sufficient water to make said slurry fluid, and from 1,000 to 10,000 parts per million sodium chloride in said water as a second water loss reducing agent.

3. A cement composition comprising a major portion of a dry hydraulic cement mixed with minor weight percentages of the weight of said dry hydraulic cement of a minor but effective amount of a water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers and from 0.02 to 8% sodium chloride as a second water loss reducing agent.

4. A cement composition comprising a major portion of a dry hydraulic cement mixed with minor weight percentages of the weight of said dry hydraulic cement of 0.1 to 10% of a water loss reducing agent consisting of acid carboxyalkyl hydroxyethyl cellulose mixed ethers in which the alkyl group contains 1 to 2 carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and from 0.02 to 8% sodium chloride as a second water loss reducing agent.

5. A cement composition comprising a major portion of Portland cement mixed with minor weight percentages of the weight of said dry Portland cement of 0.3 to 3% of a water loss reducing agent consisting of an alkali metal carboxymethyl hydroxyethyl cellulose mixed ether, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and from 0.04 to 4% sodium chloride as a second water loss reducing agent.

6. A cement composition aqueous slurry comprising a major portion of a dry hydraulic cement mixed with minor weight percentages of the weight of said dry hydraulic cement of 0.1 to 10% of a water loss reducing agent consisting of acid carboxyalkyl hydroxyethyl cellulose mixed ethers in which the alkyl group contains 1 to 2 carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, 1 to 70% of a lightweight aggregate, sufficient water to make said slurry fluid, and from 500 to 20,000 parts per million by weight sodium chloride in said water as a second water loss reducing agent.

7. A cement composition comprising a major portion of a dry hydraulic cement mixed with minor weight percentages of the weight of said dry hydraulic cement of 0.1 to 10% of a water loss reducing agent consisting of acid carboxyalkyl hydroxyethyl cellulose mixed ethers in which the alkyl group contains 1 to 2 carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, 1 to 70% of a lightweight aggregate, and from 0.02 to 8% sodium chloride as a second water loss reducing agent.

8. A cement composition consisting essentially by weight of 100 parts Portland cement, 1 to 4 parts bentonite, 15 to 50 parts diatomaceous earth, 0.3 to 3 parts of a first water loss reducing agent selected from the group consisting of alkali metal carboxymethyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35 and the carboxyalkyl substitution is from 0.15 to 1.2, and salts of said mixed ethers, 0.3 to 7 parts of a thickening time accelerating agent consisting of an alkali metal silicate having a silicon dioxide to alkali metal oxide ratio of from 0.1 to 10, and a second water loss decreasing agent consisting of 0.04 to 4 parts of sodium chloride.

9. An aqueous cement slurry consisting essentially of 100 parts of the cement composition of claims 8 and 40 to 400 parts water.

10. A cement composition aqueous slurry consisting essentially of a major portion of Portland cement mixed with 0.3 to 3 weight percent of the dry weight of said Portland cement of a first water loss reducing agent consisting of acid carboxyalkyl hydroxyethyl cellulose mixed ethers in which the alkyl group contains 1 to 2 carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, 15 to 50 weight percent of the dry weight of said Portland cement of diatomaceous earth, sufficient water to make said slurry fluid, and from 1,000 to 10,000 parts per million by weight sodium chloride in said water as a second water loss reducing agent.

11. A cement composition consisting essentially of a major portion of dry Portland cement mixed with minor weight percentages of the weight of said dry Portland cement of 0.3 to 3 weight percent of an alkali metal carboxymethyl hydroxyethyl cellulose mixed ether in which the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, 15 to 50 percent diatomaceous earth, and 0.04 to 4 percent sodium chloride.

12. A cement composition consisting essentially by weight of 100 parts Portland cement, 15 to 50 parts diatomaceous earth, 0.3 to 3 parts of a first water loss reducing agent selected from the group consisting of alkali metal carboxymethyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35 and the carboxyalkyl substitution is from 0.15 to 1.2, and salts of said mixed ethers, 0.3 to 7 parts of a thickening time accelerating agent consisting of an alkali metal silicate having a silicon dioxide to alkali metal oxide ratio of from 0.1 to 10, and a second water loss decreasing agent consisting of 0.04 to 4 parts of sodium chloride.

13. A cement composition aqueous slurry comprising a major portion of a dry hydraulic cement mixed with minor weight percentages of the weight of said dry hydraulic cement of 0.1 to 10% of a water loss reducing agent consisting of acid carboxyalkyl hydroxyethyl cellulose mixed ethers in which the alkyl group contains 1 to 2 carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, 1 to 70% of a lightweight aggregate, 0.1 to 15% of a thickening time accelerating agent consisting of an alkali metal silicate having a silicon dioxide to alkali metal oxide ratio of from 0.1 to 10, sufficient water to make said slurry fluid, and from 500 to 20,000 parts per million by weight sodium chloride in said water as a second water loss reducing agent.

References Cited in the file of this patent

UNITED STATES PATENTS

| Re. 23,873 | Ludwig | Sept. 21, 1954 |
| 2,121,087 | Labra | June 21, 1938 |
| 2,313,107 | Wertz | Mar. 9, 1943 |
| 2,580,565 | Ludwig | Jan. 1, 1952 |
| 2,598,675 | Cutforth | June 3, 1952 |
| 2,614,634 | Lea | Oct. 21, 1952 |
| 2,629,667 | Kaveler | Feb. 24, 1953 |
| 2,673,810 | Ludwig | Mar. 30, 1954 |

UNITED STATES PATENT OFFICE
CERTIFICATE OF CORRECTION

Patent No. 2,852,402                                September 16, 1958

Francis J. Shell

It is hereby certified that error appears in the printed specification of the above numbered patent requiring correction and that the said Letters Patent should read as corrected below.

Column 5, line 12, strike out "in"; column 6, lines 20 and 22, for "amounts", each occurrence, read -- Amounts --; column 7, line 34, for "$C_6H_9ONa$" read -- $C_6H_9O_5Na$ --; column 8, line 26, insert -- EXAMPLE B -- as the heading to the paragraph that follows; column 10, line 33, for "claims" read -- claim --; column 12, list of references cited, following line 16, add the following:

OTHER REFERENCES
            "Chemistry of Cement and Concrete", by
            Lea and Desch, (1935), page 190.

Signed and sealed this 13th day of January 1959.

(SEAL)
Attest:

KARL H. AXLINE                                ROBERT C. WATSON
Attesting Officer                              Commissioner of Patents